(12) United States Patent
Lee et al.

(10) Patent No.: US 10,723,348 B2
(45) Date of Patent: Jul. 28, 2020

(54) VEHICLE WITH DRIVER WARNING SYSTEM AND METHOD OF CONTROL

(71) Applicants: HYUNDAI MOTOR COMPANY, Seoul (KR); KIA MOTORS CORPORATION, Seoul (KR)

(72) Inventors: Tae Young Lee, Yongin-si (KR); Eungseo Kim, Suwon-si (KR); DongHyun Sung, Hwaseong-si (KR); Jonghyeok Park, Seosan-si (KR); Sangmin Lee, Seoul (KR); Junghyun Kim, Seoul (KR); Donghyuk Kim, Hwaseong-si (KR); Yongseok Kwon, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 75 days.

(21) Appl. No.: 16/029,010

(22) Filed: Jul. 6, 2018

(65) Prior Publication Data

US 2019/0256084 A1    Aug. 22, 2019

(30) Foreign Application Priority Data

Feb. 20, 2018    (KR) .................... 10-2018-0019603

(51) Int. Cl.
*B60W 30/09*    (2012.01)
*G06K 9/00*    (2006.01)
(Continued)

(52) U.S. Cl.
CPC ............ *B60W 30/09* (2013.01); *B60Q 9/008* (2013.01); *B60T 7/12* (2013.01); *B60T 7/22* (2013.01); *B60W 50/14* (2013.01); *G06K 9/00845* (2013.01); *B60T 2201/022* (2013.01); *B60T 2220/02* (2013.01); *B60W 2540/22* (2013.01);
(Continued)

(58) Field of Classification Search
CPC ......................... G06K 9/00845; B60W 50/14
See application file for complete search history.

(56) References Cited

U.S. PATENT DOCUMENTS 9,260,095 B2 * 2/2016 Chundrlik, Jr. ......... B60T 8/171
2007/0247524 A1 * 10/2007 Yoshinaga ........... G06K 9/0061
348/78
2016/0117947 A1 * 4/2016 Misu ....................... G09B 9/04

FOREIGN PATENT DOCUMENTS

JP    2006231963 A  *  9/2006
JP    2009146029 A  *  7/2009
(Continued)

*Primary Examiner* — Alan D Hutchinson
*Assistant Examiner* — Emily J Senn
(74) *Attorney, Agent, or Firm* — Brinks Gilson & Lione (57) ABSTRACT

A vehicle, which adjusts a collision warning time based on driver's field of view and visibility of the object, is provided. The vehicle includes: a distance sensor that collects data of an object, a camera that collects image data, a driver recognition sensor that collects driver's facial data, and a controller that analyzes driver's gaze and field of view using the driver's facial data, analyzes visibility of the object using the image data, and calculates a collision warning time based on a result of analyzing the driver's gaze and field of view and the visibility of the object, and an alarm device that informs the driver of the risk of collision at the collision warning time under the control of the controller.

14 Claims, 8 Drawing Sheets

(51) Int. Cl.
  *B60Q 9/00*    (2006.01)
  *B60T 7/12*    (2006.01)
  *B60W 50/14*   (2020.01)
  *B60T 7/22*    (2006.01)

(52) U.S. Cl.
  CPC ... *B60W 2554/00* (2020.02); *B60W 2710/182* (2013.01)

(56) References Cited

FOREIGN PATENT DOCUMENTS

| | | |
|---|---|---|
| JP | 2012-173803 A | 9/2012 |
| JP | 2016-048552 A | 4/2016 |
| JP | 2016-057490 A | 4/2016 |
| JP | 2017-199142 A | 11/2017 |
| KR | 10-2013-0113088 | 10/2013 |
| KR | 10-2014-0052664 | 5/2014 |

\* cited by examiner

1) IN CASE OF LOOKING TO THE LEFT $$C = \frac{x-x_1}{x-x_2} = \frac{x-x_1(\uparrow)}{x-x_2(\downarrow)} < 1$$

2) IN CASE OF LOOKING TO THE RIGHT $$C = \frac{x-x_1}{x-x_2} = \frac{x-x_1(\downarrow)}{x-x_2(\uparrow)} > 1$$

1. DRIVER'S GAZE DIRECTION(C): RIGHT SIDE
   ⇒ DRIVER'S ATTENTION DISTRIBUTION FUNCTION : $f(a)=0.5$

2. VISIBILITY INDEX OF THE OBJECT (I):
   FORWARD OBJECT (SOLID LINE) − SURROUNDING ENVIRONMENT (DOTTED LINE)
   $I = |\Sigma((255,255,255)-((255,255,0)+(0,0,0)))| = 255$ 3. RECOGNITION INDEX (DI): $DI = \frac{765-255}{765} \times 0.5 = 0.33$ 4. COLLISION WARNING TIME $(Th_p)$: $Th_p = \frac{2}{1+0.33} \times Th_{basic} = 1.5 Th_{basic}$

FIG.8

VEHICLE WITH DRIVER WARNING SYSTEM AND METHOD OF CONTROL

CROSS-REFERENCE TO RELATED APPLICATION

This application claims priority to and the benefit of Korean Patent Application No. 10-2018-0019603, filed on Feb. 20, 2018, which is incorporated by reference herein in its entirety.

FIELD

The present disclosure relates to a vehicle that controls a warning of collision with an object, and a method of controlling the vehicle.

BACKGROUND

The statements in this section merely provide background information related to the present disclosure and may not constitute prior art.

As vehicle safety technology, there is a collision avoidance assistance system for recognizing an object approaching a vehicle using a radar, a camera, etc., determining a risk of collision with the object, and informing a driver of the vehicle of the risk of collision or braking the vehicle to stop.

Such a conventional collision avoidance assistance system determines the risk of collision using only the type of the forward object and the distance data with respect to the forward object, and calculates the collision warning time. We have discovered that the conventional collision avoidance assistance system provides the collision warning at a certain warning time without considering whether the driver recognizes the forward object, and thus the driver can feel uncomfortable because the warning is provided at the warning time calculated without counting on the driver's recognition of the forward object.

For this reason, we have discovered that informing the driver of the risk of the collision at a desired time by adjusting the collision warning time in consideration of the driver's recognition of the forward object improves driver's comfort and provides more comfortable driving environment.

SUMMARY

The present disclosure provides a vehicle capable of informing a driver of the risk of collision at an optimal time by controlling a collision warning time in consideration of the driver's gaze, field of view and visibility of the forward object, and a method of controlling the vehicle. Accordingly, the satisfaction of the driver, the reliability of the system, and the accident prevention effect can be enhanced.

Additional aspects of the disclosure will be set forth in part in the description which follows and, in part, will be obvious from the description, or may be learned by practice of the disclosure.

In accordance with an aspect of the present disclosure, a vehicle includes a distance sensor configured to collect data of an object; a camera configured to collect image data; a driver recognition sensor configured to collect driver's facial data; and a controller configured to analyze driver's gaze and field of view using the driver's facial data, analyze visibility of the object using the image data, and calculate a collision warning time based on a result of analyzing the driver's gaze and field of view and the visibility of the object; and an alarm device configured to inform the driver of the risk of collision at the collision warning time under the control of the controller.

The controller may be configured to calculate a driver's attention distribution function by analyzing the driver's gaze and the field of view, calculate a visibility index by analyzing the visibility of the object, and calculate a recognition index using the driver's attention distribution function and the visibility index.

The controller may be configured to calculate the collision warning time using the recognition index and a predetermined reference warning time.

The controller may be configured to calculate the driver's attention distribution function on the two-dimensional coordinate system by setting the center line of the driver's field of view as the vertical axis and the straight line passing the specific coordinates of the object as the horizontal axis.

The driver's attention distribution function may be defined as a normal distribution density function.

The controller may be configured to calculate the visibility index of the object by extracting a color coordinate value of the object and a color coordinate value of a surrounding environment of the object from the image data and subtracting a sum of the color coordinate value of the object and the color coordinate value of the surrounding environment of the object from a maximum color coordinate value.

The recognition index may be calculated according to the following equation:

$$DI = \frac{765 - I}{765} \times f(\alpha)$$

(DI: recognition index, I: visibility index, f(a): driver's attention distribution function value)

The collision warning time may be calculated according to the following equation:

$$Th_p = \left(\frac{2}{1 + DI}\right) \times Th_{basic}$$

($Th_p$: Collision warning time, DI: Recognition index, $Th_{basic}$: Reference warning time)

The vehicle may further comprise a braking device configured to brake the vehicle at the collision warning time under the control of the controller.

In accordance with another aspect of the present disclosure, a control method of a vehicle includes collecting data of an object, image data and driver's facial data; analyzing, by a controller, driver's gaze and field of view using the driver's facial data; analyzing visibility of the object using the image data; calculating a collision warning time based on a result of analyzing the driver's gaze and field of view and the visibility of the object; and informing the driver of the risk of collision at the collision warning time.

The analyzing the driver's gaze and field of view may further include calculating a driver's attention distribution function, the analyzing the visibility of the object using the image data may further include calculating a visibility index of the object, and the method may further include calculating a recognition index using the driver's attention distribution function and the visibility index.

The calculation of the collision warning time may be performed by calculating a collision warning time using the recognition index and a predetermined reference warning time.

The calculating a driver's attention distribution function may further include setting, by the controller, a two-dimensional coordinate system in which the center line of the driver's field of view is the vertical axis and the straight line passing the specific coordinates of the object is the horizontal axis, and the driver's attention distribution function may be calculated on the two-dimensional coordinate system.

The driver's attention distribution function may be defined as a normal distribution density function.

Calculating a visibility index of the object may further include extracting, by the controller, a color coordinate value of the object and a color coordinate value of a surrounding environment of the object from the image data, and the visibility index may be calculated by subtracting a sum of the color coordinate value of the object and the color coordinate value of the surrounding environment of the object from a maximum color coordinate value.

The recognition index may be calculated according to the following equation:

$$DI = \frac{765 - I}{765} \times f(\alpha)$$

(DI: recognition index, I: visibility index, f(a): driver's attention distribution function value)

The collision warning time may be calculated according to the following equation:

$$Th_p = \left(\frac{2}{1 + DI}\right) \times Th_{basic}$$

($Th_p$: Collision warning time, DI: Recognition index, $Th_{basic}$: Reference warning time)

The method may further include braking, by a braking device, the vehicle at the collision warning time under the control of the controller.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

This specification does not describe all components of forms, and general information in the technical field to which the present disclosure belongs or overlapping information between the forms will not be described. The terms "portion", "module", "member", and "block", as used herein, may be implemented as software or hardware, and according to forms, a plurality of "portions", "modules", "members", or "blocks" may be implemented as a single component, or a single "portion", "module", "member", or "block" may include a plurality of components.

Throughout this specification, when a portion is "connected" to another portion, this includes the case in which the portion is indirectly connected to the other portion, as well as the case in which the portion is directly connected to the other portion, and the indirect connection includes a connection through a wireless communication network.

Also, it will be understood that when the terms "includes," "comprises," "including," and/or "comprising," when used in this specification, specify the presence of a stated component, but do not preclude the presence or addition of one or more other components.

It will be understood that, although the terms first, second, etc. may be used herein to describe various components, these components should not be limited by these terms. These terms are only used to distinguish one component from another.

It is to be understood that the singular forms "a," "an," and "the" include plural referents unless the context clearly dictates otherwise.

Reference numerals used in operations are provided for convenience of description, without describing the order of the operations, and the operations can be executed in a different order from the stated order unless a specific order is definitely specified in the context.

Hereinafter, an operation principle and forms of the present disclosure will be described in detail with reference to the accompanying drawings.

Figure 1:
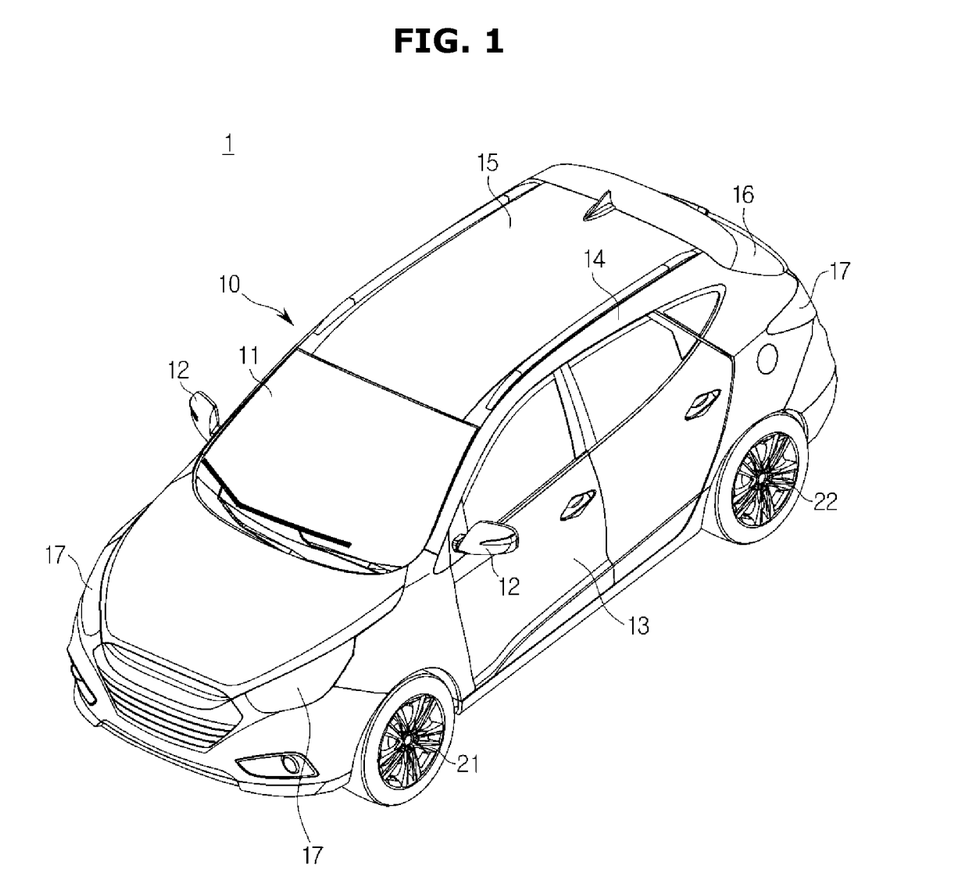
FIG. 1 shows the outer appearance of a vehicle.
Figure 2:
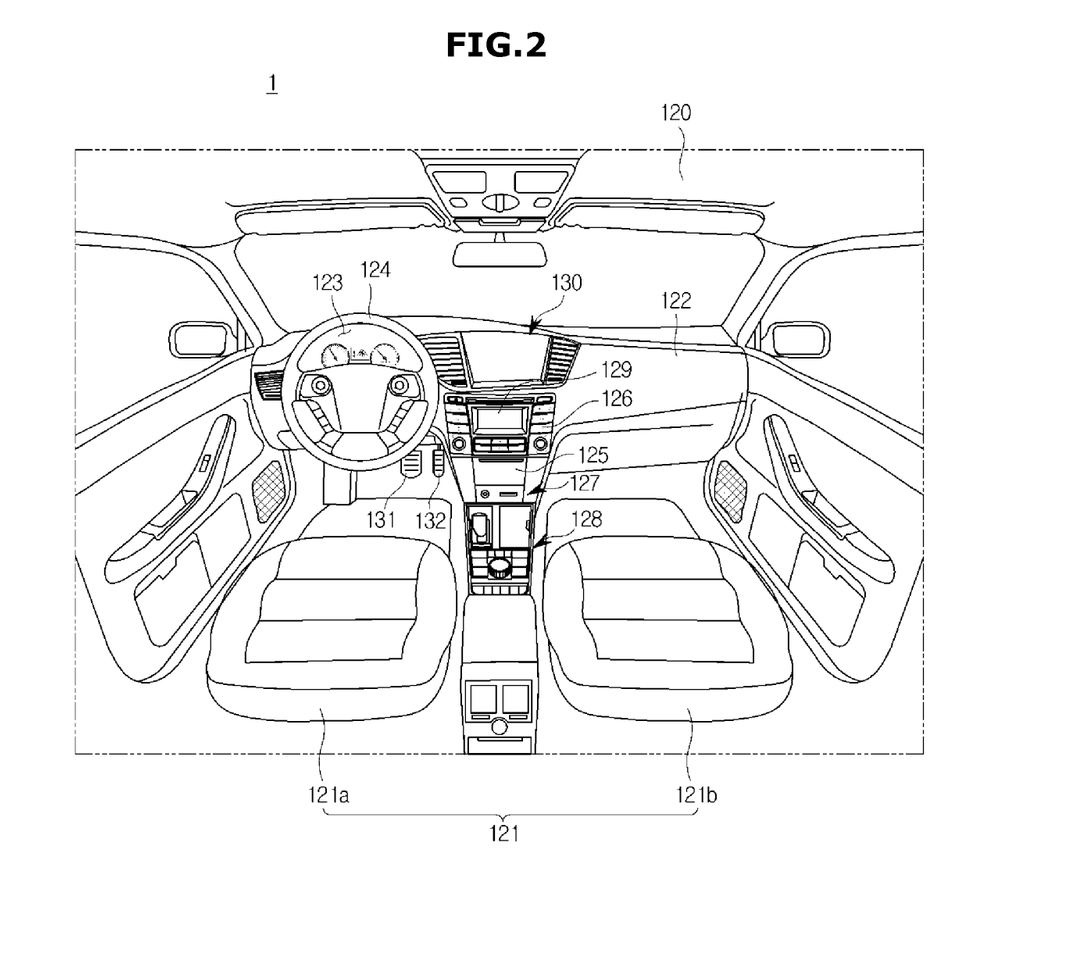
FIG. 2 shows the inside of a vehicle.

FIG. 1 shows the outer appearance of a vehicle in one form, and FIG. 2 shows the inside of a vehicle in one form.

Referring to FIG. 1, a vehicle 1 may include a main body 10 forming the outer appearance of the vehicle 1, a windscreen 11 configured to provide a driver with a front view of the vehicle 1, a plurality of side-view mirrors 12 configured to provide the driver with side and rear views of the vehicle 1, a plurality of doors 13 configured to shield the inside of the vehicle 1 from the outside, a roof panel 15, a plurality of fillers 14 configured to support the roof panel 15, a rear window glass 16, a plurality of turn signals 17, a plurality of front wheels 21 disposed in a front portion of the vehicle 1, and a plurality of rear wheels 22 disposed in a rear portion of the vehicle 1, wherein the front wheels 21 and the rear wheels 22 are collectively referred to as wheels.

The windscreen 11 may be disposed in the front upper portion of the main body 10 to enable the driver inside the vehicle 1 to acquire visual information of a front view of the vehicle 1. Also, the side-view mirrors 12 may include a left side-view mirror disposed to the left of the main body 10 and a right side-view mirror disposed to the right of the main body 10 so that the driver inside the vehicle 1 can acquire visual information about side and rear views of the vehicle 1.

The doors 13 may be rotatably provided to the left and right of the main body 10 to allow the driver to open one of them and get into the vehicle 1. Also, the doors 13 may shield the interior of the vehicle 1 from the outside when all of them close.

The vehicle 1 may further include a distance sensor 200 for detecting an object located in front or back or on the side of the vehicle 1, a camera 300 for capturing an image around the vehicle 1, and a driver recognition sensor 400 for collecting driver's facial data.

The distance sensor 200 or the camera 300 may be equipped in the front radiator grill or front head lamp of the vehicle 1 or may be integrated with heating wires in the back of the roof panel 15, i.e., in an upper portion of the rear window glass 16, but is not limited thereto.

The driver recognition sensor 400 may be a camera that captures the face of the driver and may be installed inside the vehicle 1. There is no particular limitation on the internal position of the vehicle 1 on which the driver recognition sensor 400 is installed. However, since the driver's gaze changing according to the driver's facial movement is analyzed on the basis of the driver's front view, it would be appropriate to be installed in the front position of the driver.

The distance sensor 200 may be a sensor for measuring a distance to an object at regular intervals, such as a laser sensor, an infrared sensor, a radar sensor, a LiDAR sensor, etc. The distance sensor 200 scans the surface of an object located within a measurement range in real time while the vehicle is moving.

The LiDAR sensor may detect a distance to an object, the direction, speed, temperature, material distribution and concentration property, etc., by radiating laser and detecting the laser reflected from the object. The LiDAR sensor scans the surface of the object in a way of sampling and outputs the sampled dot data.

Referring to FIG. 2, the interior 120 of the main body 10 may include a plurality of seats 121 (121a and 121b) on which passengers sit, a dashboard 122, an instrument panel (that is, a cluster 123) which is disposed on the dashboard 122 and on which a tachometer, a speedometer, a coolant thermometer, a fuel gauge, a turn signal indicator light, a high beam indicator light, a warning light, a seat belt warning light, an odometer, a traveling recorder, an automatic transmission lever indicator light, a door open warning light, an engine oil warning light, a fuel warning light, etc. are mounted, a steering wheel 124 for enabling the driver to change a moving direction of the vehicle 1, and a center fascia 125 on which an audio system and a control panel of an air conditioner are mounted.

The seats 121 may include a driver seat 121a on which a driver sits, a passenger seat 121b on which a passenger sits, and a back seat that is provided in the back inside the vehicle 1.

The cluster 123 may be implemented in a digital manner. That is, the cluster 123 implemented in the digital manner may display information of the vehicle 1 and driving information as images.

The center fascia 125 may include a head unit 126 disposed in the dashboard 122 between the driver seat 121a and the passenger seat 121b, and configured to control the audio system, the air conditioner, and seat heaters. The head unit 126 may include a plurality of buttons to receive commands for operating the audio system, the air conditioner, and the seat heaters.

In the center fascia 125, a vent, a cigar jack, a multi-terminal 127, etc. may be installed. The multi-terminal 127 may be disposed adjacent to the head hcat unit 126, and further include a USB port, an AUX terminal, and a SD slot.

The vehicle 1 may further include an input device 128 for receiving commands for performing various functions, and a display 129 for displaying information about a function being performed and information input by a user.

The display panel of the display 129 may be a Light Emitting Diode (LED) panel, an Organic Light Emitting Diode (OLED) panel, or a Liquid Crystal Display (LCD) panel.

The input device 128 may be mounted on at least one of the head unit 126 and the center fascia 125, and include at least one physical button, such as on/off buttons for executing or stopping various functions, buttons for changing setting values of the various functions, etc. The input device 128 may transmit operating signals of the buttons to the ECU or an Audio Video Navigation (AVN) system 130.

The input device 128 may include a touch panel integrated into a display of the AVN system 130. The input device 128 may be in the shape of buttons and displayed on the display of the AVN system 130, and in this case, the input device 128 may receive position information of the displayed buttons.

The input device 128 may further include a jog dial (not shown) or a touch pad for receiving a command for moving or selecting a cursor displayed on the display of the AVN system 130. The jog dial or the touch pad may be positioned on the center fascia, etc.

Particularly, the input device 128 may receive a user input of selecting one of an autonomous driving mode and a manual driving mode in which a driver drives the vehicle. If the input device 128 receives a user input of selecting the autonomous driving mode, the input device 128 may transmit an input signal of the autonomous driving mode to a controller 500.

The controller 500 may distribute signals to components in the vehicle 1, and also transfer control signals for the components in the vehicle 1 to the individual components. The controller may be an ECU. The term "controller" is used to be interpreted in a broad sense, and it is not limited by the terminology.

Also, when a navigation function is selected, the input device 128 may receive information of a destination, and transmit the information of the destination to the AVN system 130. When a Digital Multimedia Broadcasting (DMB) function is selected, the input device 128 may receive channel and volume information, and transmit the channel and volume information to the AVN system 130.

In the center fascia 125, the AVN system 130 may be provided to receive information from the user, and output results corresponding to the received information. The AVN system 130 may perform at least one function among the navigation function, the DMB function, an audio function, and a video function, and display driving information and environment information of a road in the autonomous driving mode. The AVN system 130 may stand on the dashboard 122.

The chassis of the vehicle further includes a power generating system, a power transfer system, a traveling gear, a steering system, a braking system, an acceleration system, a suspension system, a transmission system, a fuel system, front, rear, left, and right wheels, etc. The vehicle may further include various safety systems for safety of the driver and passengers.

As an example of the braking system, a brake pedal 131 is equipped in the vehicle, and as an example of the acceleration system, an accelerator pedal 132 may be equipped in the vehicle.

The safety systems may include an airbag control unit for the purpose of the safety of driver and passengers in case of car crashes and an Electronic Stability Control (ESC) unit for stabilizing the vehicle's position while the vehicle 1 is accelerating or cornering.

In addition, the vehicle 1 may further include at least one detector, such as an approximation sensor device for detecting an obstacle or other vehicle approaching to the sides or behind, a rain sensor device for detecting whether it is raining and the amount of rainfall, a wheel speed sensor device for detecting the speed of the wheels of the vehicle 1, a lateral acceleration sensor device for detecting lateral acceleration of the vehicle 1, a yaw rate sensor device for detecting a change in angular velocity of the vehicle 1, a gyro sensor device, a steering angle sensor device for detecting turning of the steering wheel of the vehicle 1, etc.

The vehicle 1 includes an Electronic Control Unit (ECU) for controlling operation of the power generating system, power transfer system, traveling gear, steering system, braking system, suspension system, transmission system, fuel system, various safety systems and various sensor devices.

Also, the vehicle 1 may optionally include various electronic apparatuses, such as a hands-free system for improving a driver's convenience, a Global Positioning System (GPS), an audio system, a Bluetooth device, a rear camera, a charging apparatus for a terminal, and a High-pass apparatus.

The vehicle 1 may further include a start button for inputting an operation command to a start motor (not shown). That is, when the start button is turned on, the vehicle 1 may operate the start motor (not shown), and drive an engine (not shown) which is a power generating apparatus.

The vehicle 1 may further include a battery (not shown) electrically connected to the terminal, the audio system, the indoor lamp, the start motor, and the other electronic devices to supply driving power to them. The battery may perform charging using its own generator or power of the engine during driving.

Figure 3:
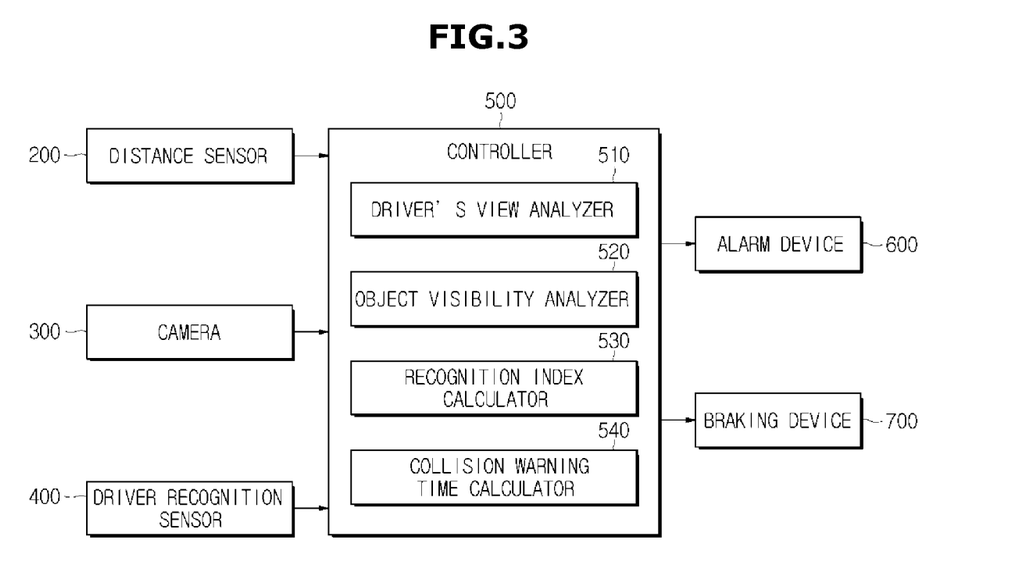
FIG. 3 shows a control block diagram of a vehicle.

FIG. 3 shows a control block diagram of a vehicle in one form.

Referring to FIG. 3, the vehicle 1 includes a distance sensor 200, a camera 300, a driver recognition sensor 400, a controller 500, an alarm device 600, and a braking device 700. The vehicle 1 may also include a memory (not shown) that stores data collected by the distance sensor 200, the camera 300, or the driver recognition sensor 400.

The distance sensor 200 may collect data about an object around the vehicle 1. The distance sensor 200 may measure a distance to an object by emitting a laser pulse signal and measuring arrival time of pulse signals reflected from the object within a measurement range. Furthermore, the distance sensor 200 may measure spatial coordinates of an object and accordingly, may collect three-dimensional (3D) information of the object. The distance sensor 200 scans the surface of an object in a way of sampling and outputs the sampled dot data. The distance sensor 200 may also measure speed of an object around the vehicle 1.

The camera 300 may collect image data around the vehicle 1. The camera 300 may acquire an image of an object around the vehicle 1 by taking pictures of the surroundings of the vehicle 1. The camera 300 may acquire an image of another vehicle that is present in front or back, or on the side of the vehicle 1, and may acquire an image of the road on which the vehicle 1 is moving.

The driver recognition sensor 400 may collect the facial data of the driver. The driver recognition sensor 400 may be a camera for capturing the face of the driver and may generate driver's facial data by detecting the movement of the driver's face and the movement of the pupil. The driver's facial data may correspond to the image data.

The controller 500 may analyze the driver's gaze and field of view by receiving driver's facial data from the driver recognition sensor 400. The driver's gaze means the center direction of the driver, and the field of view means the range where the driver may recognize the object with his/her eyes. A method of analyzing the driver's gaze and field of view is described with reference to FIGS. 4 and 5.

The controller 500 may recognize the forward object using the data of the forward object received from the distance sensor 200 and analyze the visibility of the forward object using the image data transmitted from the camera 300. A method of analyzing the visibility of a forward object is described in FIG. 6. The controller 500 may calculate the collision warning time based on the result of analyzing the driver's gaze, field of view, and/or visibility of the forward object.

The alarm device 600 may inform the driver of the risk of collision under the control of the controller 500 at the collision warning time. The alarm device 600 may inform the driver of the risk of collision by a method of stimulating at least one of the driver's visual, auditory, and tactile sense.

The braking device 700 receives the control signal from the controller 500 and operates the steering wheel 124, the brake pedal 131, the accelerator pedal 132, and the like at the calculated collision warning time so as to brake the vehicle 1.

Particularly, the controller 500 may include a driver's view analyzer 510, an object visibility analyzer 520, a recognition index calculator 530, and a collision warning time calculator 540.

The driver's view analyzer 510 may analyze the driver's gaze and field of view using the driver's facial data, and calculate the driver's attention distribution function.

Figure 4:
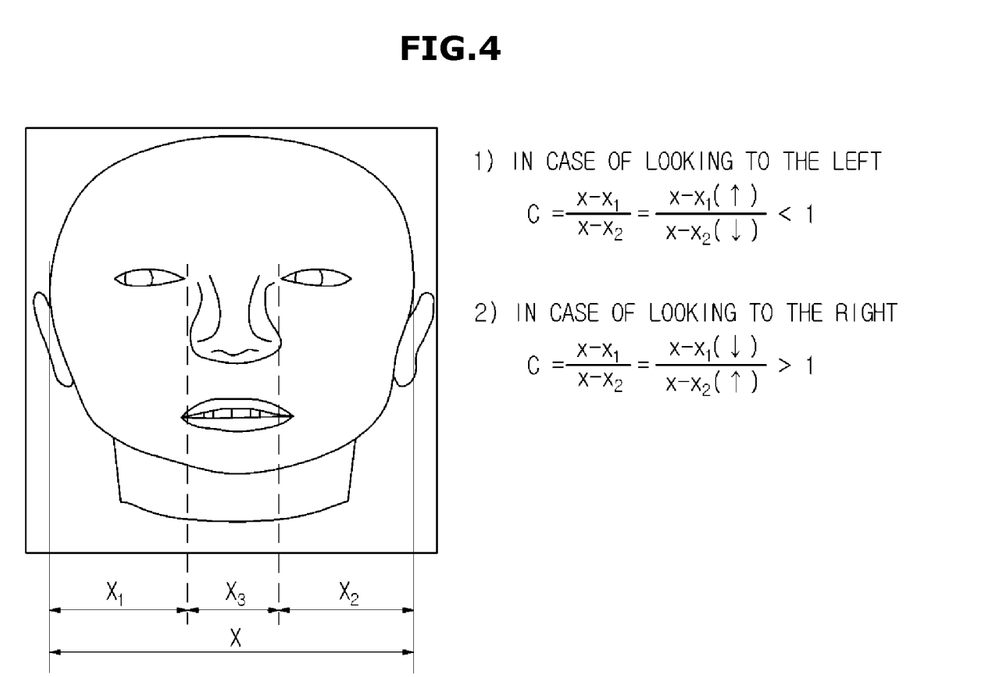
FIG. 4 is a view for illustrating a method of analyzing a driver's gaze.

Referring to FIG. 4, the driver's facial data collected by the driver recognition sensor 400 may be three-dimensional data of the driver's face. The driver's view analyzer 510 calculates the lateral length X of the driver's face and divides the driver's face into three parts in the longitudinal direction to calculate the lateral length $X_1$ of the right face and the lateral length $X_2$ of the left face. The driver's face may be divided into two parts based on the nose located in the center of the face as well as being divided into three parts by the inner end of each eye (inner corner). It is assumed that the driver's face is symmetrical.

That is, the driver's view analyzer 510 calculates the driver's gaze direction C using the entire lateral length X, the right lateral length $X_1$, and the left lateral length $X_2$ of the driver's face. The driver's gaze direction may be calculated according to the following equation 1.

$$C = \frac{x - x_1}{x - x_2} \qquad \text{[Equation 1]}$$

(X: lateral length of driver's face, $X_1$: lateral length of driver's right face, $X_2$: lateral length of driver's left face)

For example, when the driver looks at the front, C is calculated as 1 (one) because the lateral length $X_1$ of the driver's right face and the lateral length $X_2$ of the driver's left face are the same. When the driver turns his/her head while driving and looks at the left or right direction, the driver's gaze changes. The driver recognition sensor 400 captures the face of the driver at the front position of the driver and thus when the driver turns the head to the right and looks at the right direction, the lateral length $X_1$ of the driver's right face becomes shorter and the lateral length $X_2$ of the driver's left face becomes longer. Therefore, the C value is calculated to be greater than 1. When the driver turns the head to the left and looks at the left direction, the lateral length $X_1$ of the driver's right face becomes longer and the lateral length $X_2$ of the driver's left face becomes shorter. Therefore, the C value is calculated to be less than 1.

That is, as the value of C approaches 0 (zero), it may be determined that the driver's gaze has moved a lot in the left direction with respect to the front direction, and as the value of C approaches infinity ∞, it may be determined that the driver's gaze has moved a lot in the right direction.

In addition, the driver's view analyzer 510 may analyze the field of view of the driver. The field of view (FOV) of the driver may vary from person to person, but the range in which both eyes may perceive an object is generally about 120 degrees in the horizontal direction. Also, the farther the object is from the center line of the driver's field of view, the less likely the driver will be able to recognize the object clearly. That is, the closer the object is located to the center line of the driver's field of view, the more likely the driver will recognize the object clearly. The farther the object is from the center line of the driver's field of view, the less likely the driver will recognize the object clearly. The center line of the field of view is the same as the gaze. The driver's view analyzer 510 may calculate the driver's attention distribution function in consideration of the driver's field of view characteristics.

Figure 5:
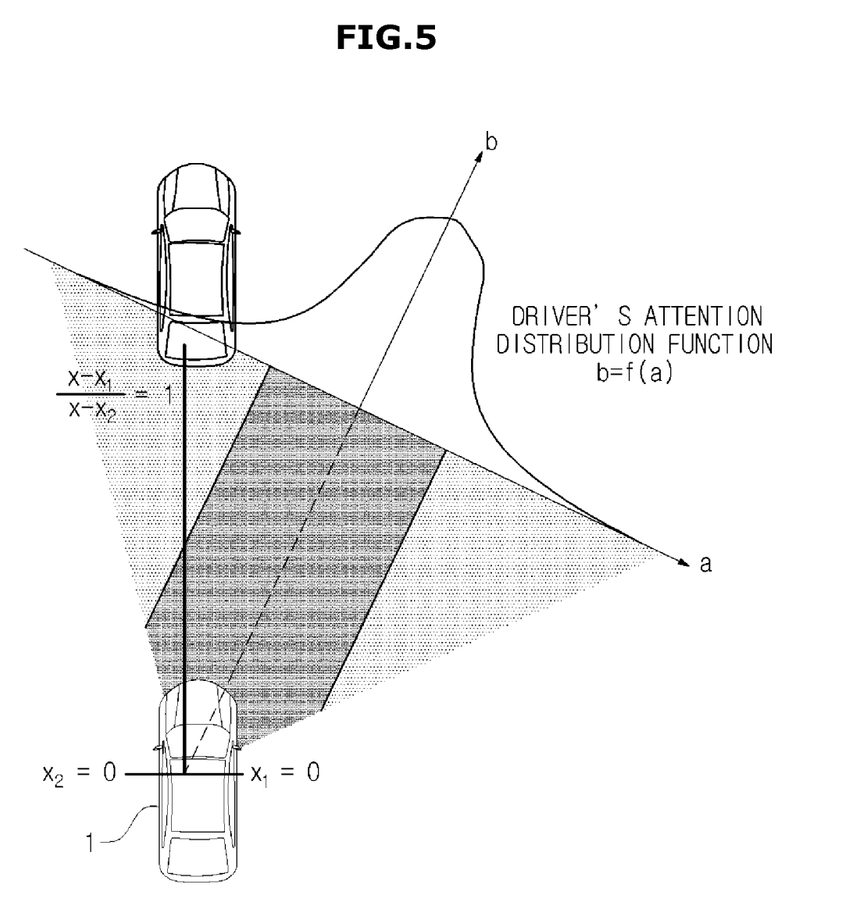
FIG. 5 is a view for illustrating a method of calculating a driver's attention distribution function by analyzing the driver's gaze and the field of view.

Referring to FIG. 5, the driver's attention distribution function may be defined as a normal distribution density function. This is because the recognition rate for an object existing outside a specific range from the center line of the driver's field of view rapidly decreases. The driver's attention distribution function may be defined as an exponential function that is symmetric with respect to the y-axis.

The driver's attention distribution function may be defined in a two-dimensional coordinate system. The driver's view analyzer 510 may set a two-dimensional coordinate system in which the center line of the driver's field of view is the vertical axis and the straight line passing the specific coordinates of the forward object is the horizontal axis, and calculate the driver's attention distribution function on the two-dimensional coordinate system. The horizontal axis indicates the distance from the center line of the driver's field of view to the object.

The driver's attention distribution function has 0 (zero) as the minimum value and 1 as the maximum value. When the forward object is present on the center line of the driver's field of view, which is the longitudinal axis of the driver's attention distribution function, the driver's attention distribution function has a maximum value. The driver's attention distribution function has a smaller value as the object is located far away from the center line of the driver's field of view. That is, the controller 500 may obtain the coordinates of the forward object and calculate the value of the driver's attention distribution function using the coordinates of the forward object.

Figure 6:
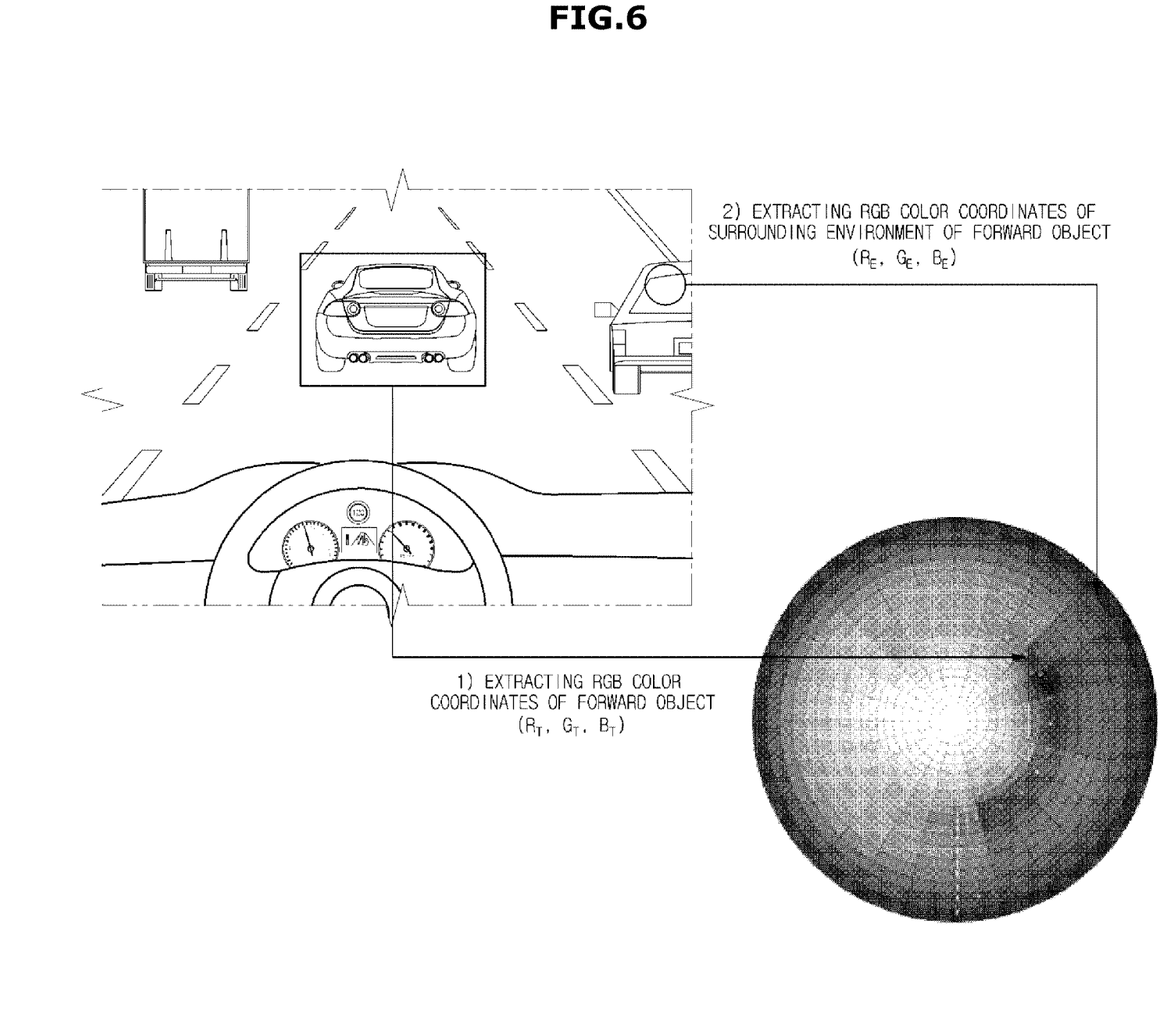
FIG. 6 is a view for illustrating a method of calculating a visibility index by analyzing a visibility of the object.

The visibility analyzer 520 may analyze the visibility of the object using the image data collected by the camera 300 and calculate the visibility index.

Referring to FIG. 6, the visibility analyzer 520 extracts the color coordinate value of the forward object and the color coordinate value of the surrounding environment of the object from the image data. The visibility analyzer 520 calculates the visibility index by subtracting the sum of the color coordinate value of the object and the color coordinate value of the surrounding environment of the object from the maximum color coordinate value. This can be expressed by the following equation 2.

$$I = |\Sigma((255,255,255) - ((R_T, G_T, B_T) + (R_E, G_E, B_E)))| \quad \text{[Equation 2]}$$

I is the visibility index of the object, ($R_T$, $G_T$, $B_T$) are the RGB color coordinates of the object, and ($R_E$, $G_E$, $B_E$) are the RGB color coordinates of the surroundings of the object. (255, 255, 255) corresponds to the maximum color coordinate value in the RGB color space.

As the visibility index (I) approaches 0 (zero), the color of the forward object and the surrounding environment of the object become closer to the complementary color, and the driver can easily distinguish the object from the surrounding environment. On the other hand, as the visibility index (I) approaches 765, the color of the forward object is similar to the color of the surrounding environment of the object, and the driver cannot easily distinguish the object from the surrounding environment.

The recognition index calculator 530 may calculate the recognition index using the driver's attention distribution function and the visibility index. The recognition index is calculated according to the following equation 3.

$$DI = \frac{765 - I}{765} \times f(\alpha) \quad \text{[Equation 3]}$$

(DI: recognition index, I: visibility index, f(a): driver's attention distribution function value)

The recognition index (DI) has a value from 0 (zero) to 1.

The collision warning time calculator 540 may calculate the collision warning time using the recognition index and the predetermined reference warning time. The collision warning time is calculated according to the following equation 4.

$$Th_p = \left(\frac{2}{1 + DI}\right) \times Th_{basic} \quad \text{[Equation 4]}$$

($Th_p$: Collision warning time, DI: Recognition index, $Th_{basic}$: Reference warning time)

The reference warning time is a warning time calculated using the distance between the vehicle 1 and the forward object without considering the driver's gaze direction.

Figure 7:
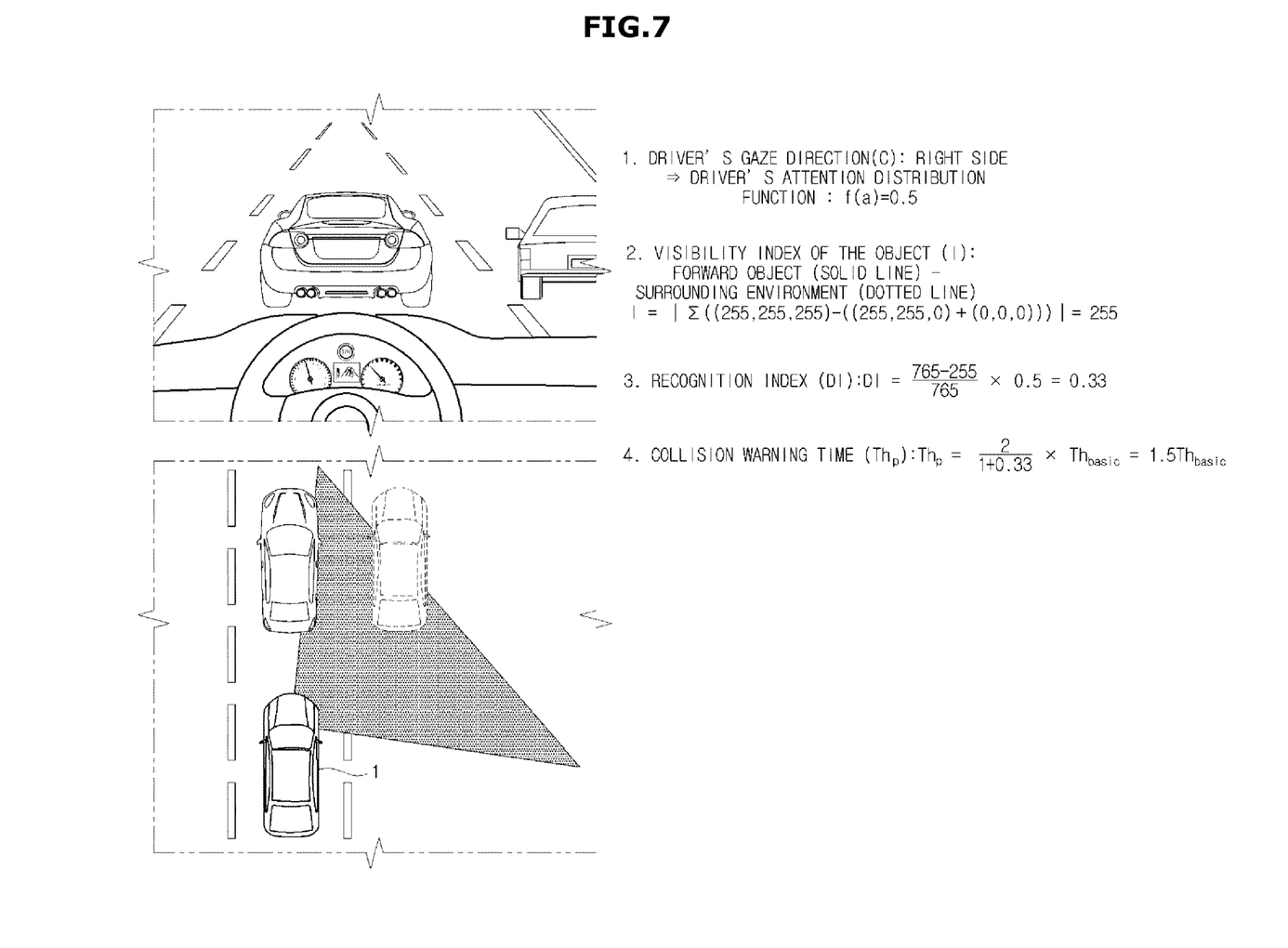
FIG. 7 shows an example in which the vehicle calculates a collision warning time in a specific situation.

FIG. 7 shows an example in which the vehicle calculates a collision warning time in a specific situation. In FIG. 7, it is assumed that the driver is driving in the daytime, there is a yellow vehicle ahead, a black object is present around the forward vehicle, and the driver is looking in the right direction.

At this time, the driver's gaze direction value C may be calculated as 2 according to Equation 1, and the driver's attention distribution function value may be calculated as 0.5. Since the color coordinate value of the forward object may be detected as (255, 255, 0) and the color coordinate value of the surrounding environment of the object can be detected as (0, 0, 0), the visibility index value may be calculated as 255 according to Equation 2. Therefore, the recognition index (DI) value is calculated to be 0.33 according to Equation 3, and the collision warning time ($Th_p$) may be calculated to be 1.5 $Th_{basic}$. That is, the vehicle 1 notifies the driver of the risk of collision or performs the braking control 1.5 times earlier than the reference warning time.

The situation assumed in FIG. 7 is only one example, and the collision warning time may be calculated in the above-described manner in various situations.

As described above, the vehicle 1 may adjust the collision warning time in consideration of the driver's gaze, field of view, and visibility of the forward object. Accordingly, the vehicle 1 may inform the driver of the risk of collision at a desired time, and may improve the satisfaction of the driver, the reliability of the system, and the accident prevention effect.

Hereinbefore, it has been described that functions are performed by inner blocks of the controller 500, however, it may be illustrated that the controller 500 performs the functions.

Figure 8:
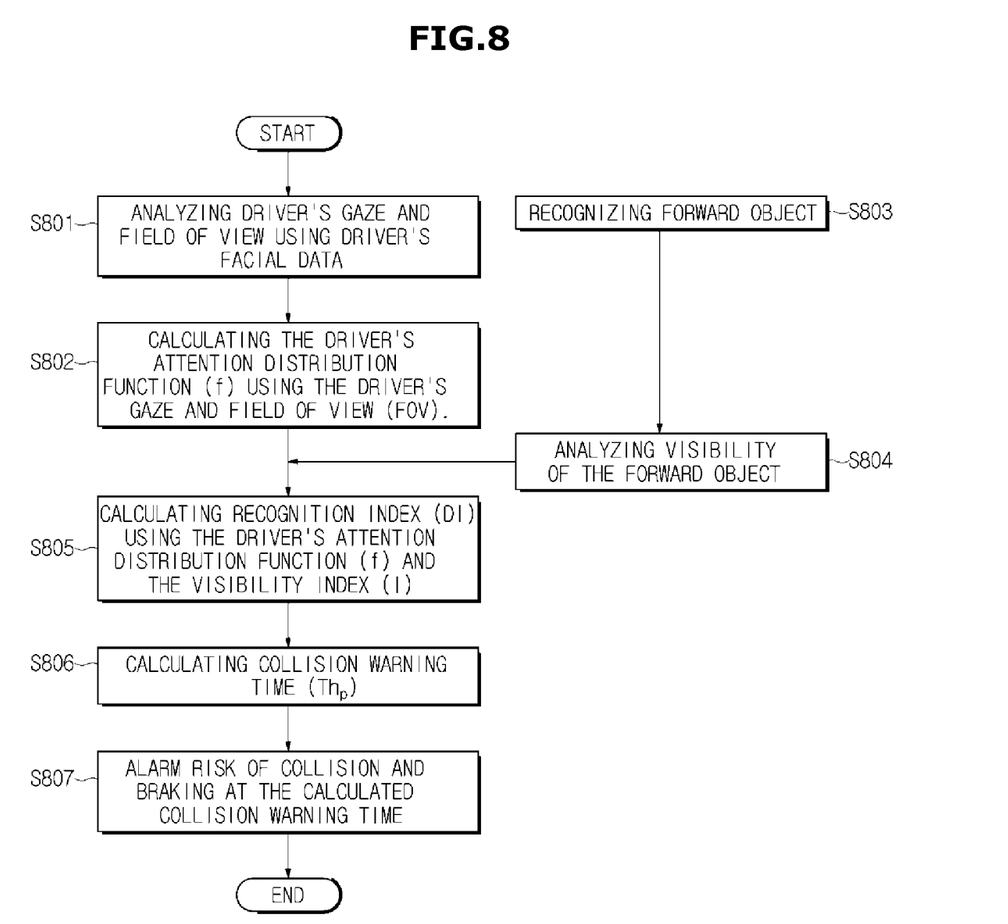
FIG. 8 is a flowchart of a method of controlling the vehicle.

FIG. 8 is a flowchart of a method of controlling the vehicle in one form of the present disclosure.

As described above, the vehicle 1 includes a distance sensor 200, a camera 300, a driver recognition sensor 400, a controller 500, an alarm device 600 and a braking device 700.

Referring to FIG. 8, the controller 500 receives the driver's facial data from the driver recognition sensor 400 and analyzes the driver's gaze and field of view (S801).

The controller 500 is able to calculate the driver's gaze direction C using the entire lateral length X, the right lateral length $X_1$, and the left lateral length $X_2$ of the driver's face, as illustrated in FIG. 4.

In addition, the controller 500 calculates the driver's attention distribution function by analyzing the driver's gaze and the field of view (S802). Since the driver's attention distribution function has been described above, redundant description is omitted.

The controller 500 acquires the facial data of the driver, receives the data of the forward object from the distance sensor 200, and recognizes the forward object (S803). In addition, the controller 500 receives the image data from the camera 300, analyzes the visibility of the object, and calculates the visibility index (S804). Since the visibility index has been described above, redundant description is omitted.

The controller 500 calculates the recognition index using the driver's attention distribution function and the visibility index of the object (S805). In addition, the controller 500 calculates a collision warning time using the recognition index and the predetermined reference warning time (S806). The controller 500 controls the alarm device 600 to notify the driver of the risk of collision at the calculated collision warning time. The controller 500 controls the braking device 700 to brake the vehicle 1 (S807).

According to the vehicle and the control method thereof, as described above, the collision warning time may be adjusted in consideration of the gaze of the driver, the field of view, and the visibility of the object. Accordingly, the driver may be provided with the collision risk notification at the optimum time, and the driver's satisfaction, system reliability, and accident prevention effect may be enhanced.

Meanwhile, the above-described forms may be embodied in the form of recording medium to store commands executable by a computer. The commands may be stored in the form of program codes, and when executed by a processor, the commands can create a program module to perform operations of the forms. The recording medium may be embodied as computer-readable recording medium.

The computer-readable recording medium may include all kinds of recording media storing commands that can be decoded by a computer. For example, the computer-readable recording medium may be Read Only Memory (ROM), Random Access Memory (RAM), a magnetic tape, a magnetic disk, flash memory, an optical data storage device, or the like.

Although a few forms of the present disclosure have been shown and described, it would be appreciated by those skilled in the art that changes may be made in these forms without departing from the principles and spirit of the disclosure.

DESCRIPTION OF SYMBOLS

1: Vehicle
200: Distance Sensor
300: Camera
400: Driver recognition sensor
500: Controller
510: Driver's view analyzer
520: Visibility analyzer
530: Recognition index calculator
540: Collision warning time calculator
600: Alarm device
700: Braking device

What is claimed is:

1. A vehicle comprising:
a distance sensor configured to collect data of an object;
a camera configured to collect image data;
a driver recognition sensor configured to collect facial data of a driver; and
a controller configured to analyze a gaze of the driver and a field of view using the facial data, to analyze visibility of the object using the image data, and to calculate a collision warning time based on a result of analyzing the gaze and the field of view and the visibility of the object,
wherein the controller is configured to:
control at least one of a warning light, an audio system or an audio video navigation (AVN) system to inform the driver of a risk of collision at the collision warning time,
calculate an attention distribution function of the driver by analyzing the gaze and the field of view,
calculate a visibility index by analyzing the visibility of the object,
calculate a recognition index using the attention distribution function and the visibility index, and
calculate the visibility index of the object by extracting a color coordinate value of the object and a color coordinate value of a surrounding environment of the object from the image data and subtracting a sum of the color coordinate value of the object and the color coordinate value of the surrounding environment of the object from a maximum color coordinate value.

2. The vehicle according to claim 1, wherein the controller is configured to calculate the collision warning time using the recognition index and a predetermined reference warning time.

3. The vehicle according to claim 2, wherein the collision warning time is calculated according to the following equation:

$$Th_p = \left(\frac{2}{1+DI}\right) \times Th_{basic}$$

where, $Th_p$ is collision warning time, DI is a recognition index, and $Th_{basic}$ is reference warning time.

4. The vehicle according to claim 1, wherein the controller is configured to calculate the attention distribution function on a two-dimensional coordinate system in which a center line of the field of view is set as a vertical axis and a straight line connecting coordinates of the object and the vertical axis is set as a horizontal axis.

5. The vehicle according to claim 4, wherein the attention distribution function is defined as a normal distribution density function.

6. The vehicle according to claim 1, wherein the recognition index is calculated according to the following equation:

$$DI = \frac{765-I}{765} \times f(\alpha)$$

where, DI is a recognition index, I is a visibility index, f(a) is an attention distribution function value of a driver.

7. The vehicle according to claim 1, further comprising a braking device configured to brake the vehicle at the collision warning time under a control of the controller.

8. A control method of a vehicle, comprising:
collecting data of an object, image data, and facial data of a driver;
analyzing, by a controller, a gaze of the driver, and a field of view using the facial data of the driver;
analyzing, by the controller, visibility of the object using the image data;
calculating, by the controller, a collision warning time based on a result of analyzing the gaze, the field of view and the visibility of the object;
informing, by an alarm device, the driver of a risk of collision at the collision warning time,
wherein:
analyzing the gaze and the field of view further comprises calculating, by the controller, an attention distribution function of the driver, and
analyzing the visibility of the object using the image data comprises calculating, by the controller, a visibility index of the object; and
calculating, by the controller, a recognition index using the attention distribution function of the driver and the visibility index of the object, wherein:
calculating the visibility index of the object comprises extracting, by the controller, a color coordinate value of the object and a color coordinate value of a surrounding environment of the object from the image data, and
the visibility index is calculated by subtracting a sum of the color coordinate value of the object and the color coordinate value of the surrounding environment of the object from a maximum color coordinate value.

9. The method according to claim 8, wherein the calculation of the collision warning time is performed by the controller using the recognition index and a predetermined reference warning time.

10. The method according to claim 9, wherein the collision warning time is calculated according to the following equation:

$$Th_p = \left(\frac{2}{1+DI}\right) \times Th_{basic}$$

where, $Th_p$ is collision warning time, DI is a recognition index, and $Th_{basic}$ is reference warning time.

11. The method according to claim 8, wherein calculating the attention distribution function of the driver further comprises:
setting, by the controller, a two-dimensional coordinate system in which a center line of the field of view of the driver is set as a vertical axis and a straight line connecting coordinates of the object and the vertical axis is set as a horizontal axis; and
wherein the attention distribution function of the driver is calculated, by the controller, on the two-dimensional coordinate system.

12. The method according to claim 11, wherein the attention distribution function of the driver is defined as a normal distribution density function.

13. The method according to claim 8, wherein the recognition index is calculated according to the following equation:

$$DI = \frac{765-I}{765} \times f(\alpha)$$

where, DI is a recognition index, I is a visibility index, and f(a) is an attention distribution function value of the driver.

14. The method according to claim 8, further comprising braking, by a braking device, the vehicle at the collision warning time under control of the controller.

* * * * *